(12) United States Patent
Ota et al.

(10) Patent No.: US 11,787,360 B2
(45) Date of Patent: Oct. 17, 2023

(54) VEHICLE SEAT AND METHOD FOR FOLDING SIDE AIRBAG

(71) Applicants: TOYOTA JIDOSHA KABUSHIKI KAISHA, Toyota (JP); AUTOLIV DEVELOPMENT AB, Vårgårda (SE)

(72) Inventors: Yuto Ota, Toyota (JP); Kazuhiro Kawamura, Toyota (JP); Yuta Arai, Yokohama (JP); Atsushi Nakashima, Yokohama (JP); Takayuki Shimizu, Yokohama (JP)

(73) Assignees: TOYOTA JIDOSHA KABUSHIKI KAISHA, Toyota (JP); AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/971,170

(22) Filed: Oct. 21, 2022

(65) Prior Publication Data

US 2023/0138018 A1    May 4, 2023

(30) Foreign Application Priority Data

Nov. 2, 2021 (JP) ................................. 2021-179712

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | |
|---|---|---|---|
| 6,231,070 B1 * | 5/2001 | Sunabashiri | B60R 21/237 280/730.2 |
| 7,549,672 B2 * | 6/2009 | Sato | B60R 21/2338 280/730.2 |
| 8,448,981 B2 * | 5/2013 | Fukawatase | B60R 21/23138 280/730.2 |
| 8,469,395 B2 | 6/2013 | Richez et al. | |
| 9,238,425 B2 * | 1/2016 | Fukawatase | B60R 21/013 |
| 10,632,954 B2 | 4/2020 | Zhang et al. | |
| 11,110,884 B2 * | 9/2021 | Ota | B60R 21/237 |
| 2012/0091695 A1 | 4/2012 | Richez et al. | |
| 2022/0227326 A1 * | 7/2022 | Kobayashi | B60N 2/58 |
| 2023/0034054 A1 * | 2/2023 | Shimizu | B60R 21/237 |

FOREIGN PATENT DOCUMENTS

| | | | | |
|---|---|---|---|---|
| CN | 104228751 A | * | 12/2014 | ....... B60R 21/23138 |
| DE | 102020124808 A1 | * | 4/2021 | ....... B60R 21/23138 |
| WO | 2011/006560 A1 | | 1/2011 | |
| WO | WO-2021149576 A1 | * | 7/2021 | ........... B60R 21/207 |

* cited by examiner

*Primary Examiner* — Faye M Fleming
(74) *Attorney, Agent, or Firm* — Dinsmore & Shohl LLP

(57) ABSTRACT

A vehicle seat includes a seat back, an inflator, and a side airbag. The side airbag includes a head chamber housed along an upper frame of the seat back and configured to inflate and deploy between a shoulder belt and a head in response to supply of gas from the inflator in an event of side collision. The head chamber is housed while being folded in a seat up-and-down direction to reduce a vertical width and then rolled from a front end in a seat fore-and-aft direction.

15 Claims, 12 Drawing Sheets

VEHICLE SEAT AND METHOD FOR FOLDING SIDE AIRBAG

CROSS-REFERENCE TO RELATED APPLICATION

This application claims priority to Japanese Patent Application No. 2021-179712 filed on Nov. 2, 2021, incorporated herein by reference in its entirety.

BACKGROUND

1. Technical Field

The present disclosure relates to a vehicle seat including a side airbag and a method for folding the side airbag.

2. Description of Related Art

WO2011/006560 discloses a side airbag in which a thorax section that inflates and deploys from a lateral region of a backrest of a vehicle seat and a head section that inflates and deploys from an upper region of the backrest are composed of separate bags and connected to each other via a tubular filling section. In this side airbag, the head section inflates and deploys between a shoulder belt and an occupant's head. Therefore, the head can be restrained early in the event of side collision.

SUMMARY

In the technology described in WO2011/006560, the head section is housed along the upper end of a seat frame. When the head section is housed in a roll form, the head section may overlap the skeleton of a headrest, thereby affecting deployment performance. The above related art has room for improvement in this respect.

The present disclosure provides a vehicle seat including a side airbag and a method for folding the side airbag that can improve the deployment performance of a head chamber constituting the side airbag.

A first embodiment of the present disclosure relates to a vehicle seat. The vehicle seat includes a seat back including an upper frame, an inflator configured to supply gas, and a side airbag. The side airbag includes a head chamber housed along the upper frame of the seat back and configured to inflate and deploy between a shoulder belt and a head in response to supply of gas from the inflator in an event of side collision. The head chamber is housed while being folded in a seat up-and-down direction to reduce a vertical width and then rolled from a front end in a seat fore-and-aft direction.

In the first embodiment, the side airbag inflates and deploys in response to the supply of gas from the inflator in the event of side collision. The side airbag includes the head chamber housed along the upper frame of the seat back. The head chamber inflates and deploys between the shoulder belt and the head of an occupant to restrain the head at an early stage. The head chamber is housed while being folded in the seat up-and-down direction to reduce the vertical width and then rolled from the front end in the seat fore-and-aft direction. Therefore, the head chamber can be housed along the upper frame at a position that does not overlap the skeleton of a headrest. As a result, the inflation and deployment of the head chamber toward a front side of the seat are not impaired by the headrest, and the deployment performance of the head chamber is improved. In the first embodiment, the description "the head chamber is housed along the upper frame" may be a broad concept including not only a case where the entire head chamber is housed along the upper frame, but also a case where a part of the head chamber is housed along the upper frame. The description "in the event of side collision" may include not only a case where the occurrence of the side collision of the vehicle is actually detected, but also a case where the occurrence of the side collision of the vehicle is predicted.

In the first embodiment, the head chamber may be housed while being folded in the seat up-and-down direction multiple times into a bellows form and then rolled from the front end in the seat fore-and-aft direction.

In the structure described above, the head chamber may be folded in the seat up-and-down direction multiple times into the bellows form and then rolled from the front end in the seat fore-and-aft direction. Therefore, the rolled portion is released and the bellows portion is released at the same time during the inflation and deployment of the head chamber. When the bellows portion is released, the head chamber deploys toward an upper side of the seat over the shoulder belt. As a result, the inflation and deployment of the head chamber toward the front side of the seat are not impaired by the shoulder belt, and the deployment performance of the head chamber is improved.

In the first embodiment, the head chamber may be housed while being rolled from the front end in the seat fore-and-aft direction after an upper end in the seat up-and-down direction is folded downwardly toward an occupant and a lower end obtained by folding the upper end is folded upwardly toward the occupant.

In the structure described above, the head chamber may be rolled from the front end in the seat fore-and-aft direction after the upper end in the seat up-and-down direction is folded downwardly toward the occupant and the lower end obtained by folding the upper end is folded upwardly toward the occupant. By folding the upper end of the head chamber twice toward the occupant into the bellows form, the rolled portion is released and, at the same time, the bellows portion is released toward the upper side and an inner side of the seat during the inflation and deployment of the head chamber. As a result, when the head chamber deploys toward the upper side of the seat over the shoulder belt, a deployment space can satisfactorily be secured between the shoulder belt and the headrest, thereby facilitating the deployment of the head chamber toward the front side of the seat.

In the first embodiment, the head chamber may be housed while being folded in the seat up-and-down direction to reduce the vertical width, rolled from the front end in the seat fore-and-aft direction, and inwardly rolled into a roll form at least at a rear end that is an end of winding with a distal end of rolling located on an inner side of the seat.

In the structure described above, the head chamber may be folded in the seat up-and-down direction to reduce the vertical width, rolled from the front end in the seat fore-and-aft direction, and inwardly rolled at least at the rear end that is the end of winding. At an initial stage of the inflation and deployment of the head chamber, the inwardly rolled portion is released toward the inner side of the seat between the shoulder belt and the headrest. As a result, the inflation and deployment of the head chamber toward the front side of the seat are not impaired by the headrest and the shoulder belt, and the deployment performance is improved.

In the first embodiment, the seat back may include a side frame, and the side airbag may include a torso chamber housed along a region from a side portion to a shoulder of the side frame of the seat back and configured to inflate and deploy on a side of a torso in the event of side collision. The head chamber and the torso chamber may be provided in a single bag, and may be housed while being inwardly rolled from the front end in the seat fore-and-aft direction.

In the structure described above, the side airbag may include the torso chamber housed along the region from the side portion to the shoulder of the side frame of the seat back. In the event of side collision of the vehicle, the torso chamber inflates and deploys on the side of the torso of the occupant to restrain the torso at an early stage. In the side airbag, the head chamber and the torso chamber may be provided in a single bag. Therefore, the side airbag may be housed along the upper frame via the shoulder from the side portion of the side frame. The head chamber and the torso chamber may be housed while being inwardly rolled from the front end in the seat fore-and-aft direction. Therefore, the side airbag can easily be folded by inwardly rolling the entire side airbag including the head chamber and the torso chamber. Further, the deployment performance of the head chamber can be improved.

A second embodiment of the present disclosure relates to a method for folding a side airbag including a head chamber to be housed along an upper frame of a seat back. The method for folding the side airbag includes folding the head chamber in a seat up-and-down direction to reduce a vertical width and rolling the head chamber from a front end in a seat fore-and-aft direction.

According to the second embodiment, the inflation and deployment of the head chamber toward the front side of the seat are not impaired by the headrest, and the deployment performance of the head chamber is improved.

As described above, according to the first embodiment and the second embodiment of the present disclosure, it is possible to improve the deployment performance of the head chamber constituting the side airbag.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
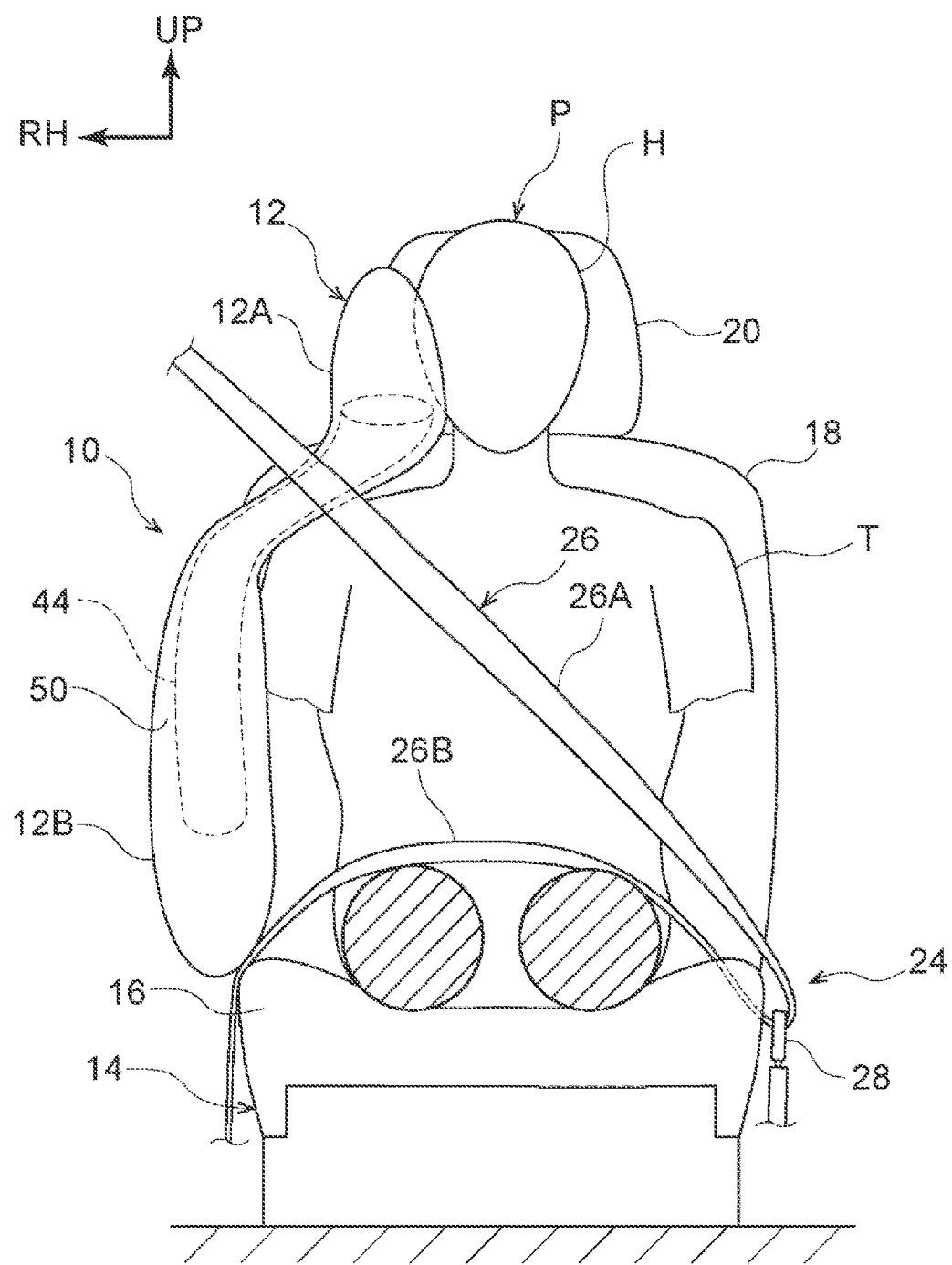
FIG. 1 is a front view showing a vehicle seat according to an embodiment in a state in which a side airbag inflates and deploys.

Hereinafter, a vehicle seat 14 including a side airbag device 10 according to an embodiment will be described with reference to FIGS. 1 to 8C. Arrows FR, UP, LH, and RH in the drawings indicate a seat front side, a seat upper side, a seat left side, and a seat right side of the vehicle seat 14 including the side airbag device 10, respectively. When description is made using directions of "front" and "rear", "right" and "left", and "up" and "down", the terms "front" and "rear" indicate a front and a rear in a seat fore-and-aft direction, the terms "right" and "left" indicate a right and a left in a seat width direction, and the terms "up" and "down" indicate a top and a bottom in a seat up-and-down direction unless otherwise specified.

Figure 7A:
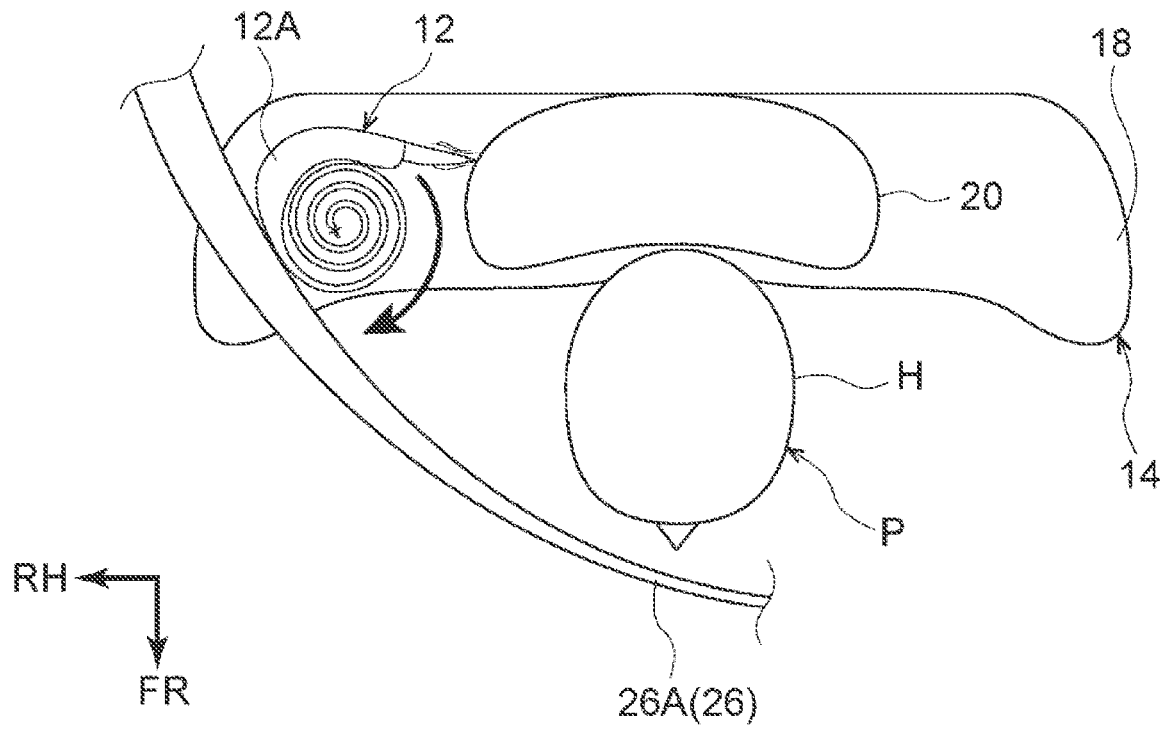
FIG. 7A is a plan of the vehicle seat for description of behavior of the side airbag according to the embodiment during inflation and deployment, showing behavior at an initial stage of the inflation and deployment.
Figure 7B:
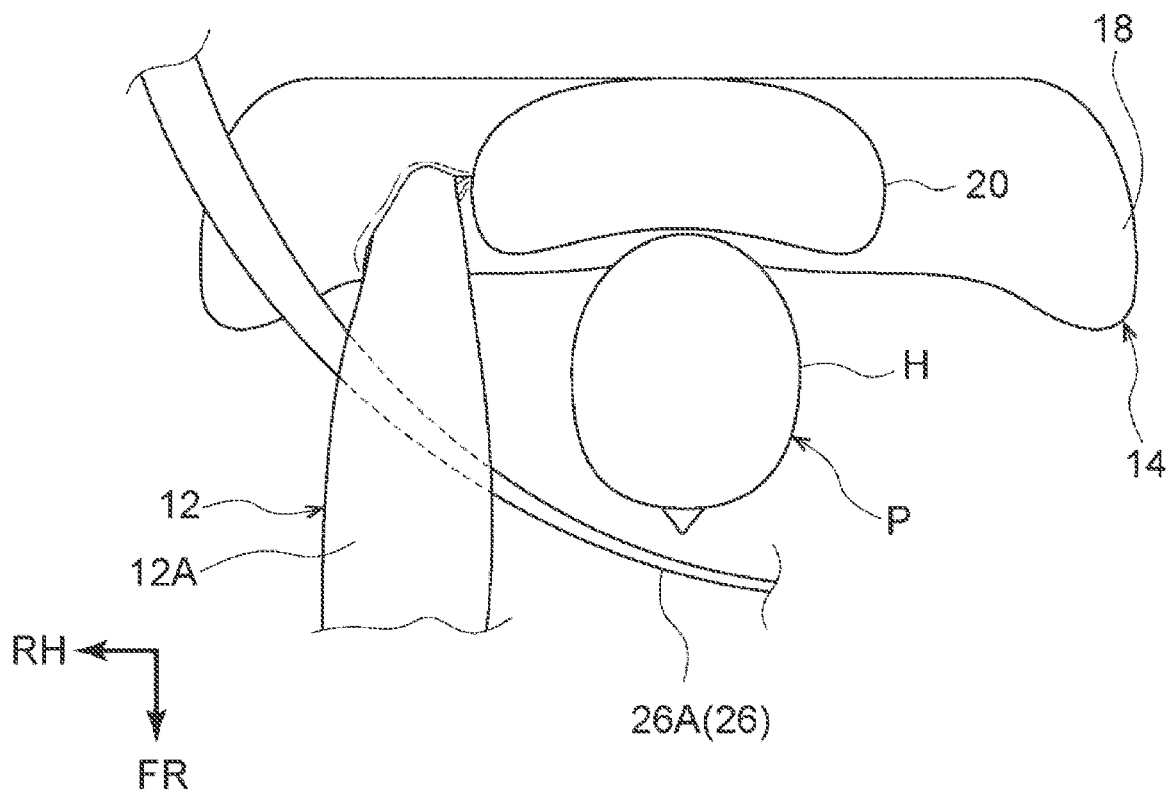
FIG. 7B is a plan of the vehicle seat for the description of the behavior of the side airbag according to the embodiment during the inflation and deployment, showing behavior at a latter stage of the inflation and deployment.

A dummy P for a collision test is seated on the vehicle seat 14 shown in FIGS. 1, 7A, and 7B instead of an actual occupant. Examples of the dummy P include AM50 (50th percentile of an American adult male) of the World Side Impact Dummy (World SID). In the following description, the dummy will be referred to as "occupant P".

Vehicle Seat

Figure 2:
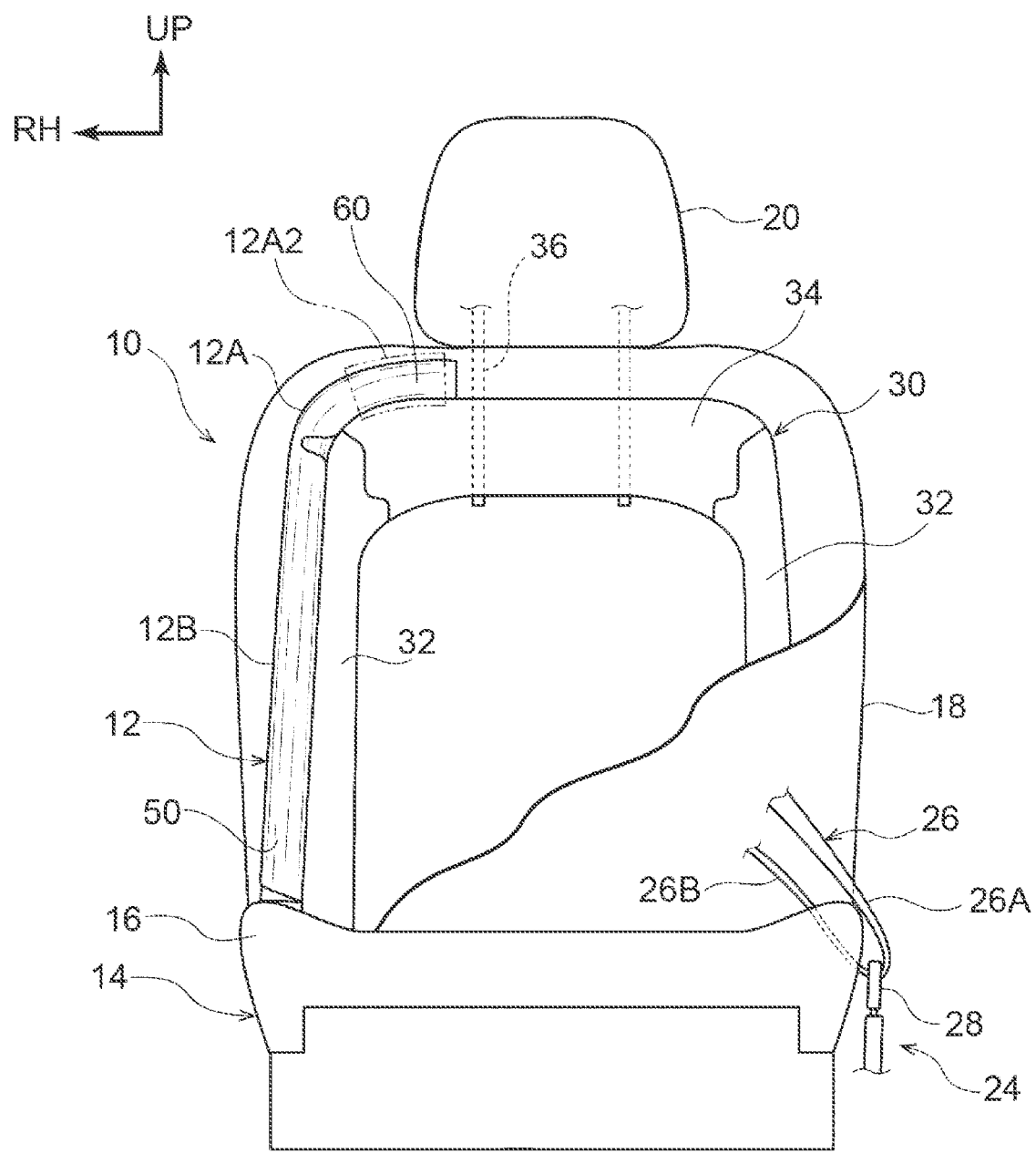
FIG. 2 is a partially cutout front view showing the vehicle seat according to the embodiment in a state in which the side airbag is housed.

As shown in FIGS. 1 and 2, the vehicle seat 14 including the side airbag device 10 includes a seat cushion 16, a seat back 18, and a headrest 20. For example, the vehicle seat 14 is arranged in a driver's seat on a right side of a vehicle, and the front of the seat and the front of the vehicle coincide with each other. The right and left in the seat width direction and the right and left in a vehicle width direction coincide with each other.

The seat cushion 16 extends in the seat fore-and-aft direction and the seat width direction, and can support buttocks and thighs of the occupant P. The seat back 18 is turnably coupled to the rear end of the seat cushion 16 and extends in the seat up-and-down direction. The seat back 18 can support the back of the occupant P. The headrest 20 is provided at the upper end of the seat back 18 and can support a head H of the occupant P.

Seat Belt Device

The occupant P is restrained to the vehicle seat 14 by a seat belt device 24. The seat belt device 24 includes a webbing 26 that restrains the upper body and the waist of the occupant.

The webbing 26 has a long band shape, and includes a shoulder belt 26A that restrains the upper body of the occupant P to the seat back 18 and a lap belt 26B that restrains the waist of the occupant when the webbing 26 is attached to the occupant P. The shoulder belt 26A extends diagonally from the shoulder on the right side of the occupant P to the waist on the left side. The lower end of the shoulder belt 26A is inserted through a tongue plate 28.

The tongue plate 28 is detachable from a buckle (reference symbol is omitted) provided on the left side of the seat. The occupant P is restrained by the webbing 26 by attaching the tongue plate 28 to the buckle.

The one end of the webbing 26 that is looped back through the tongue plate 28 extends to the right side of the seat, and a portion extending in the seat width direction serves as the lap belt 26B. Therefore, the left end of the lap belt 26B is connected to the lower end of the shoulder belt 26A. The right end of the lap belt 26B is fixed to a belt anchor (not shown) provided on a floor panel.

The upper end of the shoulder belt 26A is looped around a shoulder anchor (not shown) provided on a vehicle body. The end of the webbing 26 is reeled by a retractor (not shown).

Side Airbag Device

Figure 3:
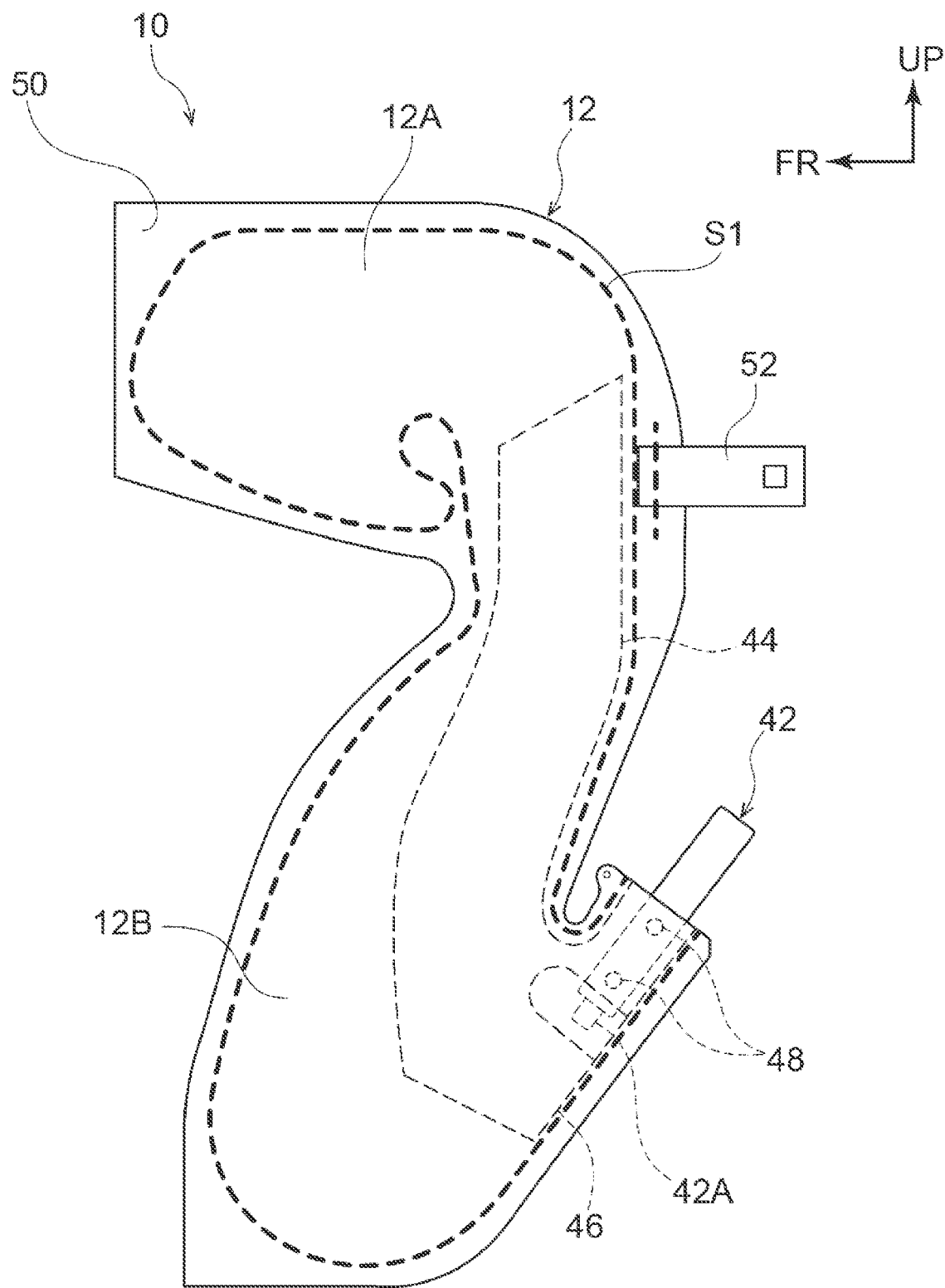
FIG. 3 is an enlarged side view showing a state in which the side airbag according to the embodiment inflates and deploys.

As shown in FIGS. 2 and 3, the side airbag device 10 includes a side airbag 12, an inflator 42, and a sock 44.

The side airbag 12 is housed inside the seat back 18, and is fixed to a seat back frame 30 constituting the skeleton of the seat back 18. As partially shown in FIG. 2, the seat back frame 30 has a rectangular frame shape when viewed in the seat fore-and-aft direction, and its right and left side portions are side frames 32 extending in the seat up-and-down direction. The upper end of the seat back frame 30 is an upper frame 34 extending in the seat width direction to bridge the shoulders (upper ends) of the right and left side frames 32. The side airbag 12 is housed along the upper frame 34 via the shoulder from the side portion of the side frame 32 on the right side of the seat while being folded into an elongated rod shape.

The side airbag 12 inflates by being supplied with gas generated by the inflator 42. The side airbag 12 inflates and deploys between the body of the occupant P and the side of a vehicle cabin by rupturing an outer skin of the seat back 18 in the seat width direction with an inflation pressure.

The side airbag 12 is a single bag, and includes a head chamber 12A that is an upper part on the upper side of the seat, and a torso chamber 12B that is a lower part on the lower side of the seat.

The head chamber 12A inflates and deploys between the shoulder belt 26A and the head H of the occupant P in response to the supply of gas from the inflator 42 to cover the side of the head H. The torso chamber 12B inflates and deploys on the side of a torso T of the occupant P (portion extending from the shoulder to the waist via the thorax) in response to the supply of gas from the inflator 42 to cover the side of the torso T. The detailed structure of the side airbag 12 will be described later.

The inflator 42 is a cylinder-type gas generator having a substantially cylindrical shape, and its axial direction is along the side frame 32 of the seat back 18. A gas injector 42A is provided at the lower end of the inflator 42. When a side collision of the vehicle is detected or predicted, the gas injector 42A generates gas and supplies the gas to the side airbag 12.

As shown in FIG. 3, a part of the inflator 42 is arranged inside the side airbag 12. The inflator 42 has stud bolts 48 extending inward in the seat width direction from an outer surface located inside the side airbag 12, and is fixed to the side frame 32 together with a base cloth 50 of the side airbag 12 by inserting the stud bolts 48 through the side frame 32 and tightening the stud bolts 48 with nuts.

The sock 44 made of a cloth material is further provided inside the side airbag 12. The sock 44 is referred to also as "duct", "inner tube", "baffle cloth", or "diffuser".

The sock 44 has a substantially cylindrical shape with upper and lower open ends, and extends from the head chamber 12A to the torso chamber 12B in the seat up-and-down direction. A bag-shaped inflator insertion portion 46 is integrally provided at the rear end of the sock 44. The gas injector 42A of the inflator 42 and the inside of the sock 44 communicate with each other via the inflator insertion portion 46. Therefore, the gas supplied from the inflator 42 flows to the head chamber 12A and the torso chamber 12B through the sock 44.

Side Airbag

The detailed structure of the side airbag 12 will be described below. The side airbag 12 is formed into a bag shape by arranging two base cloths 50 made of, for example, nylon-based or polyester-based cloth materials in the seat width direction and sewing their outer peripheral portions. In FIG. 3, the sewn portion of the outer peripheral portions of the base cloths 50 is represented by reference symbol "S1".

An upper portion of the side airbag 12 is the head chamber 12A that covers the side of the head H of the occupant P during inflation and deployment. The head chamber 12A has a substantial C-shape with its break oriented to the lower side of the seat when viewed in the seat width direction. A band-shaped support belt 52 is sewn at the rear end of the head chamber 12A. One end of the support belt 52 is attached to a stay 36 (see FIG. 2) constituting the skeleton of the headrest 20, thereby stabilizing the behavior of the head chamber 12A during the inflation and deployment.

A lower portion of the side airbag 12 is the torso chamber 12B that covers the side of the torso T of the occupant during the inflation and deployment. The torso chamber 12B has a shape of a drop bulging downward when viewed in the seat width direction, and extends in the up-and-down direction along the seat back 18.

Method for Folding Side Airbag

As described above, the side airbag 12 having the structure described above is housed along the skeleton of the seat back 18 while being folded into the elongated rod shape. Hereinafter, a method for folding the side airbag 12 will be described with reference to FIGS. 4A to 4E. In FIGS. 4A to 4E, the sewn portion 51 of the side airbag 12 is omitted.

The method for folding the side airbag 12 according to the present embodiment is roughly divided into a first step for folding the head chamber 12A in the seat up-and-down direction, and a second step for rolling the side airbag 12 from its front end in the seat fore-and-aft direction after completion of the first step.

Figure 4A:
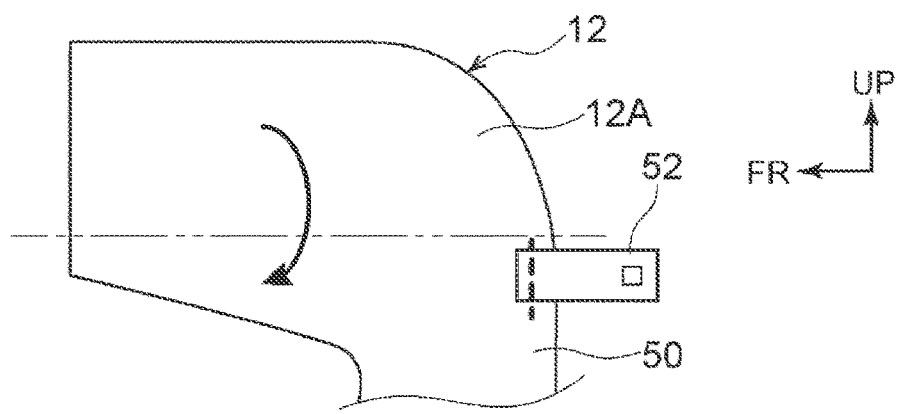
FIG. 4A is a side view of a head chamber for description of a method for folding the side airbag according to the embodiment, showing a step of downwardly folding the upper end of the head chamber in a seat up-and-down direction toward an occupant.
Figure 4B:
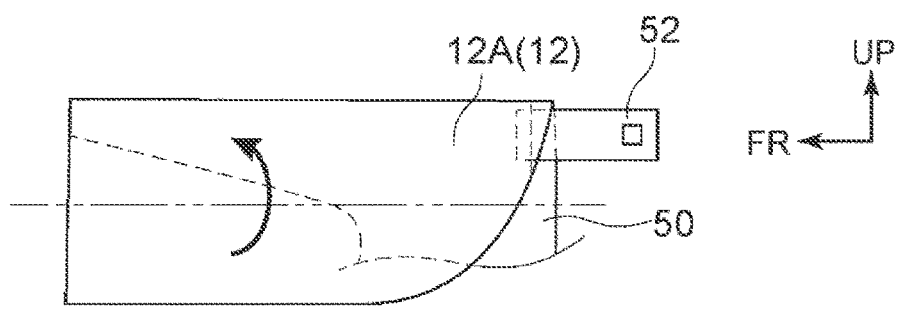
FIG. 4B is a side view of the head chamber for the description of the method for folding the side airbag according to the embodiment, showing a step of upwardly folding the folded lower end toward the occupant.
Figure 4C:
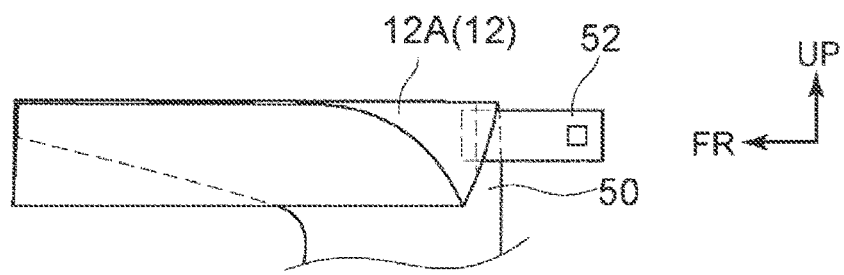
FIG. 4C is a side view of the head chamber for the description of the method for folding the side airbag according to the embodiment, showing the head chamber in a state in which the steps in FIGS. 4A and 4B are completed.

The first step will be described with reference to FIGS. 4A to 4C. In FIGS. 4A and 4B, a folding line of the head chamber 12A in each step is represented by a long dashed double-short dashed line.

In the first step shown in FIG. 4A, the upper end of the head chamber 12A in the seat up-and-down direction is first folded downwardly toward the occupant P (toward the inner side of the seat). Through this step, the portion previously located at the upper end of the head chamber 12A before the folding is currently located at the lower end by the folding.

As shown in FIG. 4B, the folded lower end is then folded upwardly toward the occupant P.

Through the steps described above, the head chamber 12A is folded in the seat up-and-down direction multiple times (twice in the present embodiment) into a bellows state. Therefore, the vertical width of the folded head chamber 12A is reduced as shown in FIG. 4C. Thus, the first step is completed.

Figure 4D:
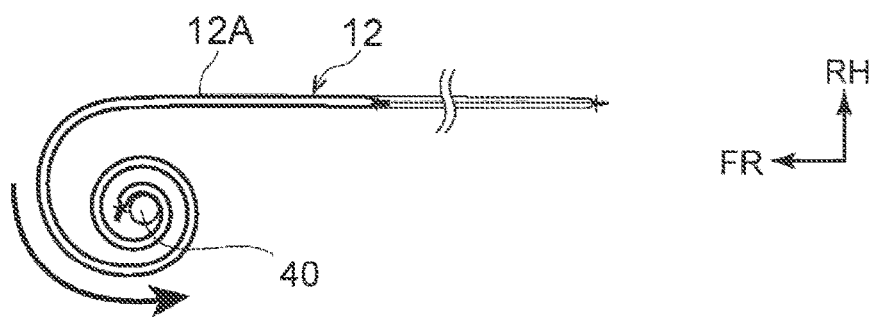
FIG. 4D is an enlarged plan of the head chamber for the description of the method for folding the side airbag according to the embodiment, showing a step of inwardly rolling the head chamber and a torso chamber from the front ends in a seat fore-and-aft direction.
Figure 4E:
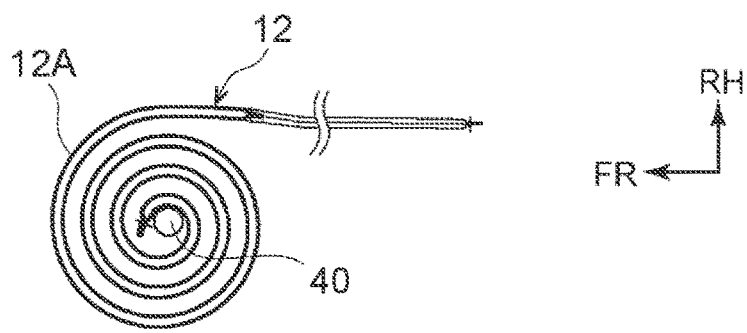
FIG. 4E is an enlarged plan of the head chamber for the description of the method for folding the side airbag according to the embodiment, showing a state in which the step of folding the side airbag is completed.

In the second step shown in FIGS. 4D and 4E, the side airbag 12 is rolled by winding the base cloth 50 around an elongated rod-shaped winding shaft 40.

In the second step shown in FIG. 4D, the winding shaft 40 is set in a posture in which its axial direction is substantially the seat up-and-down direction, and the base cloth 50 of the side airbag 12 is inwardly rolled from the front end to the rear end of the side airbag 12 in the seat fore-and-aft direction. In this step, the entire side airbag 12 including the head chamber 12A and the torso chamber 12B is inwardly rolled.

The inward rolling is a folding method in which the side airbag 12 is wound (rolled) into a roll form with the distal end of the rolling located on the inner side of the seat.

Through the step described above, the rear end of the head chamber 12A in the seat fore-and-aft direction that is the end of winding is inwardly rolled as shown in FIG. 4E. Thus, the second step is completed.

The side airbag 12 folded through the first step and the second step has an elongated rod shape. In the state in which the side airbag 12 is housed in the seat back 18 as shown in FIG. 2, the head chamber 12A is housed along the upper frame 34 of the seat back frame 30, and the torso chamber 12B is housed along a region from the side portion to the shoulder of the side frame 32.

Since the vertical width of the head chamber 12A is set small through the first step described above, the distal end (upper end) is arranged on an outer side of the seat with respect to the stay 36 of the headrest 20. That is, the head chamber 12A is housed at a position that does not overlap the skeleton of the headrest 20.

Thickness-Reduced Portion and Thickness Reduction Process

Figure 5:
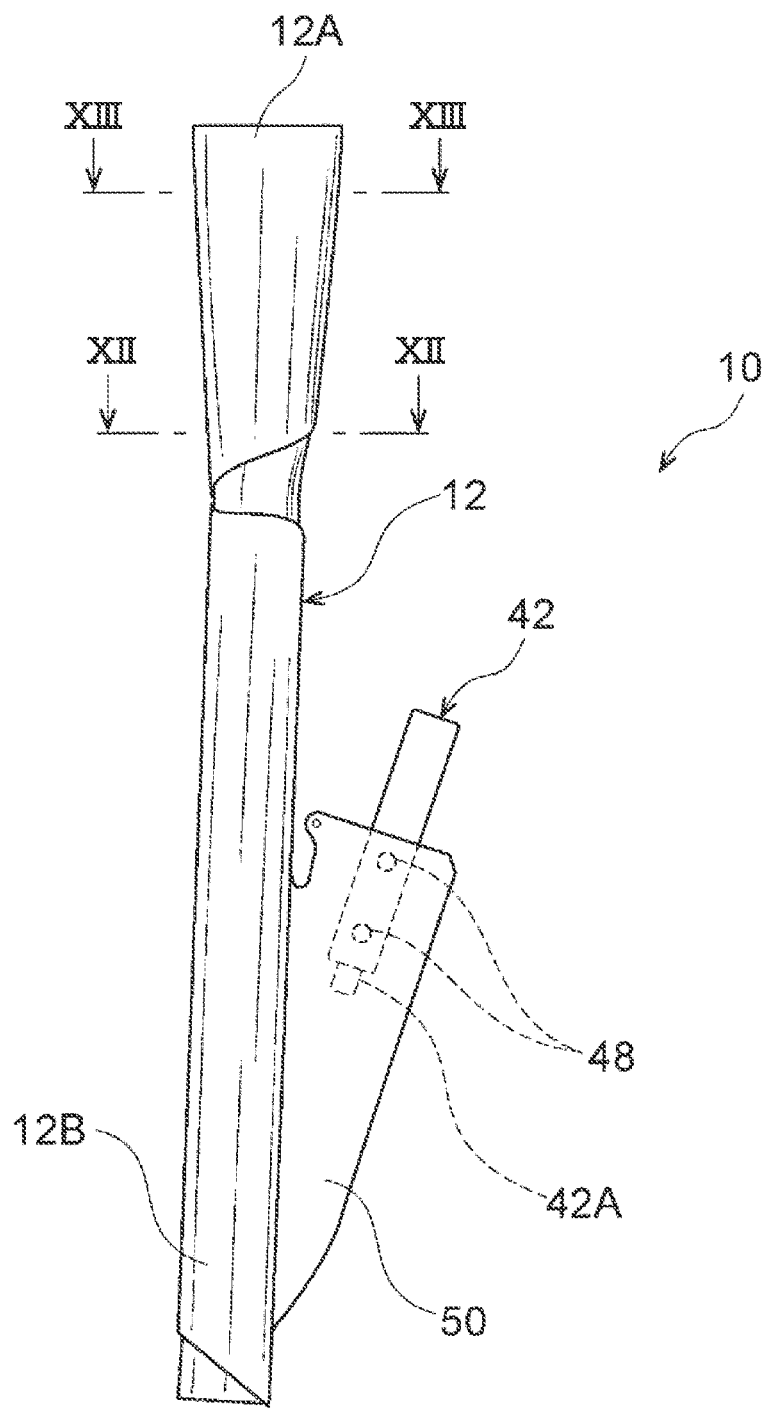
FIG. 5 is a side view of the side airbag according to the embodiment, showing a state before the folded side airbag is subjected to a thickness reduction process.
Figure 12:
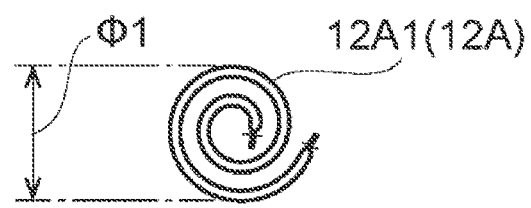
FIG. 12 is an enlarged sectional view of a cross section cut along a line XII-XII in FIG. 5, showing the state before the folded side airbag according to the embodiment is subjected to the thickness reduction process.
Figure 13:
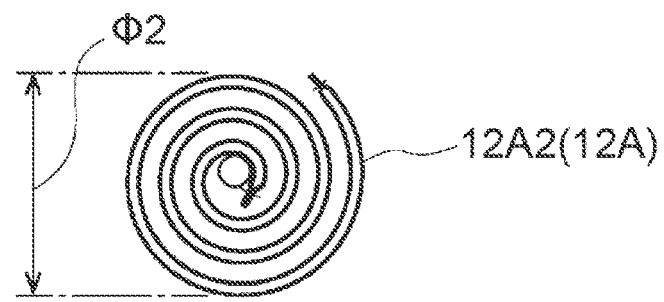
FIG. 13 is an enlarged sectional view of a cross section cut along a line XIII-XIII in FIG. 5, showing the state before the folded side airbag according to the embodiment is subjected to the thickness reduction process.

FIGS. 5, 12, and 13 are a side view and enlarged sectional views of the side airbag 12 folded through the first step and the second step. As shown in those figures, a thickness of the side airbag folded in the roll form when housed, that is, a fold thickness corresponds to a roll diameter (diameter) $\varphi$ when the side airbag 12 is viewed in the seat up-and-down direction (winding axis direction).

The roll diameter $\varphi$ of the side airbag 12 increases as the number of layers of the base cloth 50 in a radial direction increases. Therefore, the roll diameter $\varphi$ increases as the number of folds of the base cloth 50 increases along with an increase in the size and capacity of the side airbag 12. Particularly in the head chamber 12A of the present embodiment, the base cloth 50 is folded in the seat up-and-down direction prior to the rolling. Therefore, the roll diameter $\varphi$ in a predetermined region is larger than that in the other region.

For example, FIG. 12 shows a cross section of the lower end of the head chamber 12A cut along a line XII-XII in FIG. 5. In one example of the present embodiment, the lower end of the folded head chamber 12A is a first region 12A1 having a relatively small number of layers of the base cloth 50 in the radial direction. A roll diameter $\varphi 1$ of the first region 12A1 is substantially equal to the roll diameter of the torso chamber 12B.

FIG. 13 shows a cross section of the upper end of the head chamber 12A cut along a line XIII-XIII in FIG. 5. As shown in FIG. 13, in one example of the present embodiment, the upper end of the folded head chamber 12A is a second region 12A2 in which the number of layers of the base cloth 50 in the radial direction is larger than that in the first region 12A1. Therefore, a roll diameter $\varphi 2$ of the second region 12A2 is larger than the roll diameter $\varphi 1$ of the first region 12A1.

In a state in which the head chamber 12A is housed along the upper frame 34 of the seat back frame 30, the roll diameter $\varphi$ of the head chamber 12A is a fold thickness in a seat height direction. In a region having a large roll diameter, such as the second region 12A2, it is necessary to secure a mounting space in consideration of the fold thickness in the seat height direction.

Since the headrest 20 is provided above the upper frame 34, there is a great design restriction on the mounting space in the seat height direction (seat up-and-down direction). In the region having a large roll diameter $\varphi$, such as the second region 12A2 of the head chamber 12A, it is desirable to take measures to save the mounting space at the time of housing.

In the present embodiment, in the region having a large fold thickness of the head chamber 12A, such as the second region 12A2, a thickness-reduced portion 60 is provided in at least a part of the outer peripheral portion of the head chamber 12A. The thickness-reduced portion 60 is subjected to a thickness reduction process for reducing the fold thickness of the head chamber 12A by pressurization.

Figure 6:
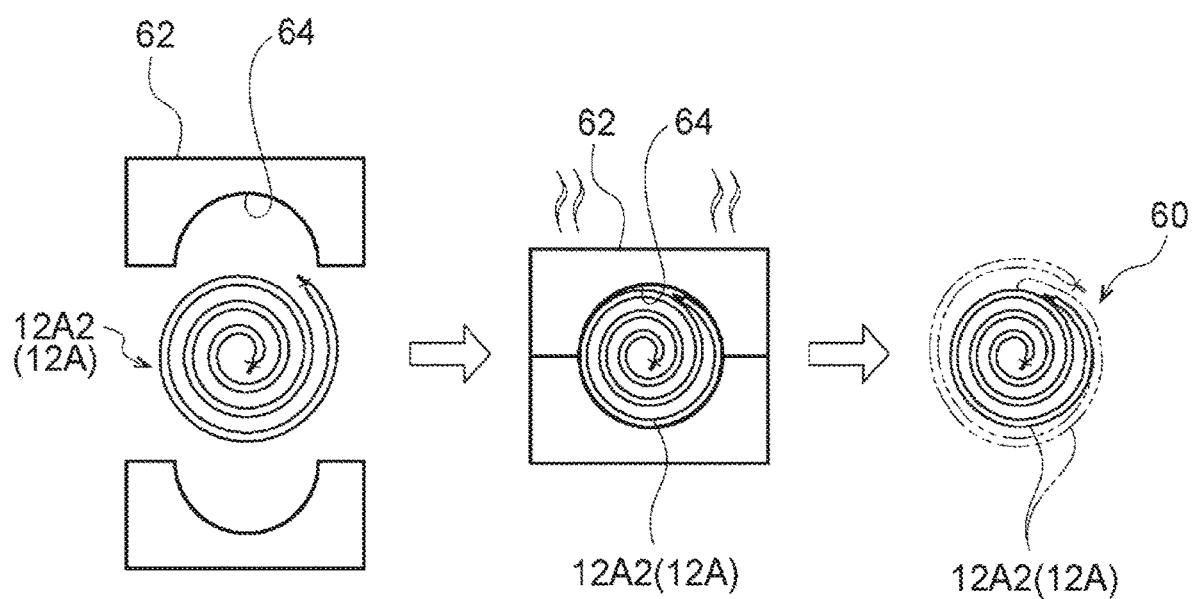
FIG. 6 is a schematic diagram for describing the thickness reduction process by heat press according to the embodiment.

FIG. 6 is a schematic diagram showing an example of the thickness reduction process. This schematic diagram shows the head chamber 12A viewed in the winding axis direction. As shown in FIG. 6, the thickness reduction process of the present embodiment is heat press using a die 62. In the process by the heat press, the folded head chamber 12A is placed to face a recess 64 formed inside the die 62, and the outer peripheral portion of the head chamber 12A is pressurized and heated in the die 62. Thus, the roll diameter φ of the head chamber 12A can be reduced. In FIG. 6, the outline of the head chamber 12A before the thickness reduction process is represented by long dashed double-short dashed lines.

The recess 64 of the present embodiment has a substantially circular outer peripheral shape, and the entire outer peripheral portion can be pressurized and heated uniformly.

The heat press having the structure described above provides a certain effect even when the side airbag 12 is made of the base cloth 50. In some embodiments, the base cloth 50 may be a coated base cloth. When the base cloth 50 is the coated base cloth, a part of the surface of a coating material such as a silicone resin or a nylon resin applied to the base cloth 50 is melted and cured again by heating. Therefore, the shape reduced by pressurization can be kept satisfactorily as compared with the case where the base cloth 50 is a non-coated base cloth.

FIG. 2 shows the head chamber 12A housed in the seat back 18 through the thickness reduction process. In FIG. 2, the second region 12A2 including the thickness-reduced portion 60 is shown by a region enclosed by a long dashed double-short dashed line. As shown in FIG. 2, the fold thickness of the second region 12A2 is reduced by the thickness-reduced portion 60, and the fold thickness of the region from the proximal end (first region 12A1) to the distal end (second region 12A2) of the head chamber 12A housed along the upper frame 34 is set to a substantially uniform fold thickness. In this way, it is possible to save the mounting space of the head chamber 12A.

Deployment Behavior of Head Chamber

Hereinafter, behavior of the head chamber 12A during inflation and deployment will be described in detail. First, the behavior of the head chamber 12A will be described with reference to plans of FIGS. 7A and 7B.

When the gas from the inflator 42 is supplied to the side airbag 12, the head chamber 12A inflates and deploys toward the front side of the seat by rupturing the outer skin at the upper end of the seat back 18. Since the head chamber 12A is arranged along the upper frame 34 at the position that does not overlap the skeleton of the headrest 20, the head chamber 12A can deploy toward the front side of the seat while suppressing interference with the skeleton of the headrest 20.

As shown in FIG. 7A, the inwardly rolled portion at the rear end of the head chamber 12A is released at an initial stage of the inflation and deployment. The inwardly rolled portion of the head chamber 12A is released toward the inner side of the seat between the shoulder belt 26A and the headrest 20. Therefore, a deployment space is secured between the shoulder belt 26A and the headrest 20. As a result, the head chamber 12A can deploy toward the front side of the seat over the shoulder belt 26A as shown in FIG. 7B.

Figure 8A:
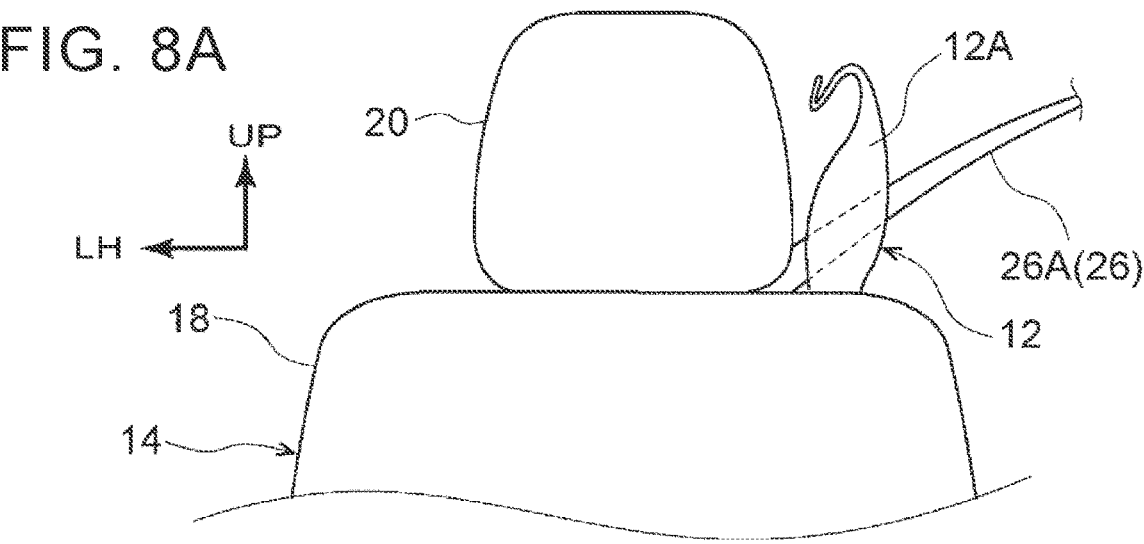
FIG. 8A is a partial rear view of the vehicle seat for the description of the behavior of the side airbag according to the embodiment during the inflation and deployment, showing the behavior at the initial stage of the inflation and deployment.
Figure 8B:
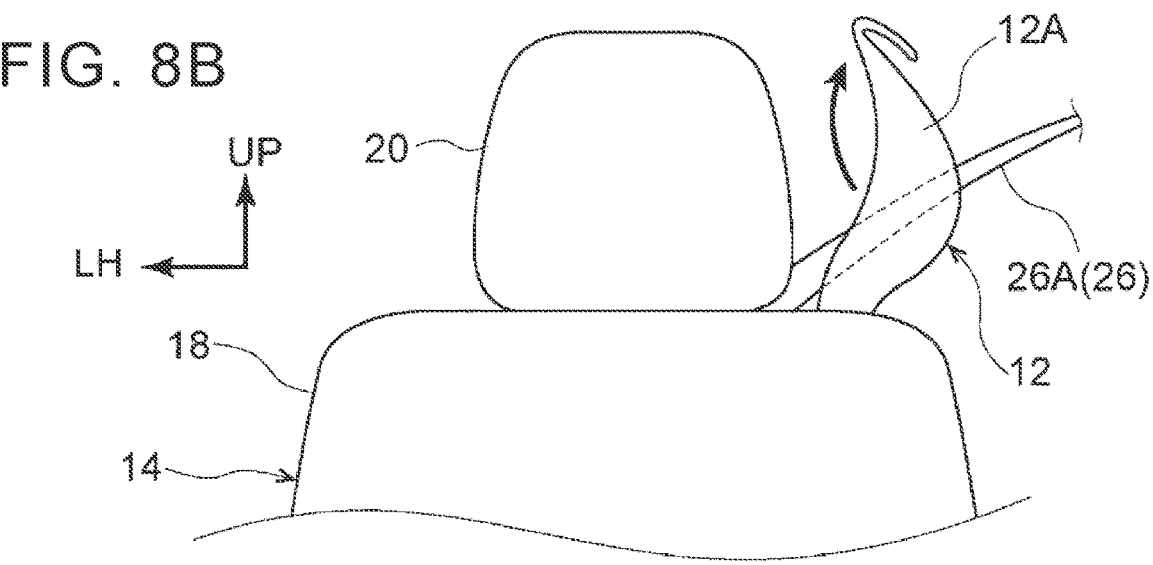
FIG. 8B is a partial rear view of the vehicle seat for the description of the behavior of the side airbag according to the embodiment during the inflation and deployment, showing behavior at a middle stage of the inflation and deployment.
Figure 8C:
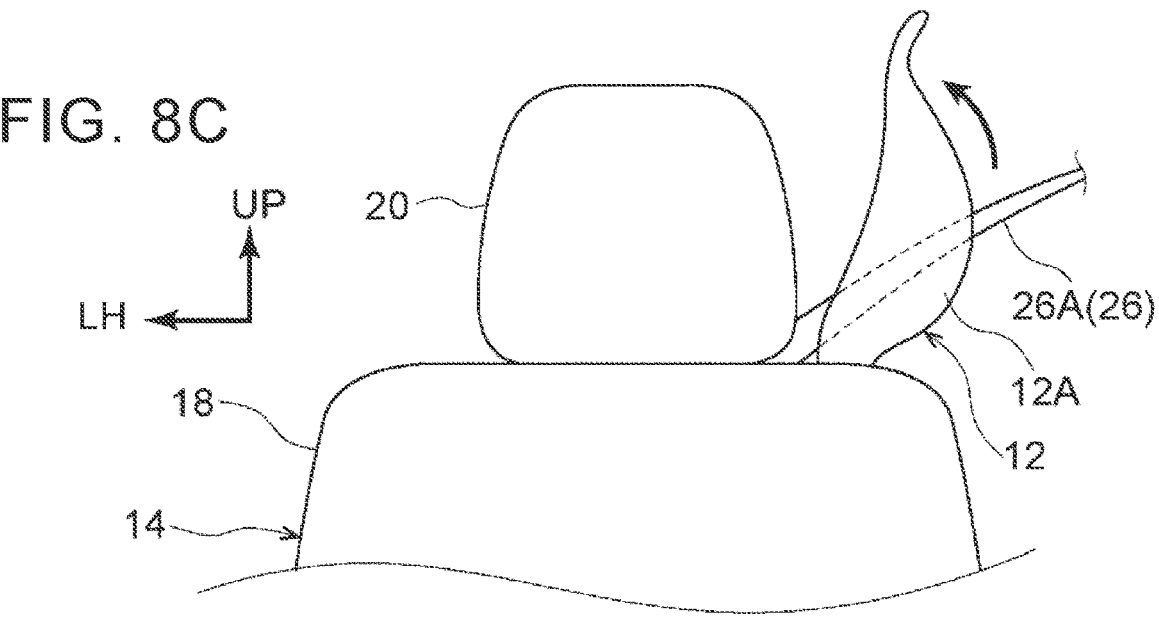
FIG. 8C is a partial rear view of the vehicle seat for the description of the behavior of the side airbag according to the embodiment during the inflation and deployment, showing the behavior at the latter stage of the inflation and deployment.

Next, the behavior of the head chamber 12A will be described with reference to rear views of the vehicle seat 14 in FIGS. 8A to 8C. During the inflation and deployment of the head chamber 12A shown in FIGS. 8A to 8C, the rolled portion is released, and the bellows portion formed by folding the head chamber 12A in the seat up-and-down direction is released at the same time. When the bellows portion is released, the upper end of the head chamber 12A deploys toward the upper side of the seat to extend easily over the shoulder belt 26A.

In the present embodiment, the head chamber 12A is folded in the seat up-and-down direction toward the occupant P. Therefore, the bellows portion is released toward the upper side and the inner side of the seat. Thus, the deployment space of the head chamber 12A can satisfactorily be secured between the shoulder belt 26A and the headrest 20.

Even if the head chamber 12A is housed with its upper end folded once toward the lower side of the seat, it is possible to obtain a certain effect that the head chamber 12A quickly deploys toward the upper side of the seat. When the head chamber 12A is folded twice as in the present embodiment, the swing of the head chamber 12A in the seat width direction can be reduced during the deployment. Thus, the deployment performance toward the upper side of the seat can be increased.

Actions and Effects

In the vehicle seat 14 of the present embodiment described above, the side airbag 12 inflates and deploys in response to the supply of gas from the inflator 42 in the event of side collision. The side airbag 12 includes the head chamber 12A housed along the upper frame 34 of the seat back 18. The head chamber 12A inflates and deploys between the shoulder belt 26A and the head H of the occupant P to restrain the head H at an early stage.

The head chamber 12A is housed while being folded in the seat up-and-down direction to reduce the vertical width and then rolled from the front end in the seat fore-and-aft direction. Therefore, the head chamber 12A can be housed along the upper frame 34 at the position that does not overlap the skeleton of the headrest 20. As a result, the inflation and deployment of the head chamber 12A toward the front side of the seat are not impaired by the headrest 20, and the deployment performance of the head chamber 12A is improved.

In the present embodiment, the head chamber 12A is folded in the seat up-and-down direction multiple times into a bellows form. Specifically, the upper end of the head chamber 12A in the seat up-and-down direction is folded downwardly toward the occupant P, the folded lower end is folded upwardly toward the occupant P, and then the head chamber 12A is rolled from the front end in the seat fore-and-aft direction. At the initial stage of the inflation and deployment of the head chamber 12A, the rolled portion is released and the bellows portion is released toward the upper side and the inner side of the seat at the same time. Therefore, the head chamber 12A deploys toward the upper side of the seat over the shoulder belt 26A, and the deployment space is secured between the shoulder belt 26A and the headrest 20. As a result, the inflation and deployment of the head chamber 12A toward the front side of the seat are not impaired by the shoulder belt 26A, and the deployment performance of the head chamber 12A is improved.

In the present embodiment, the side airbag 12 is housed while being inwardly rolled from the front end in the seat fore-and-aft direction. Therefore, the rear end of the head chamber 12A that is the end of winding is inwardly rolled. At the initial stage of the inflation and deployment of the head chamber, the inwardly rolled portion is released toward the inner side of the seat between the shoulder belt and the headrest. As a result, the inflation and deployment of the head chamber 12A toward the front side of the seat are not impaired by the headrest 20 and the shoulder belt 26A. Therefore, the deployment performance of the head chamber 12A can be increased.

In the present embodiment, the side airbag 12 is a single bag, and the head chamber 12A and the torso chamber 12B are housed while being inwardly rolled from the front end in the seat fore-and-aft direction. Therefore, the side airbag 12 can easily be folded by inwardly rolling the entire side airbag 12 including the head chamber 12A and the torso chamber 12B.

In the present embodiment, the head chamber 12A includes the thickness-reduced portion 60 in at least a part of the outer peripheral portion. Since the thickness-reduced portion 60 is subjected to the thickness reduction process for reducing the fold thickness by pressurization, the folded shape can be downsized by compressing at least the part of the outer peripheral portion. Therefore, it is possible to save the mounting space by providing the thickness-reduced portion 60 in the portion having a large fold thickness relative to the mounting space permitted depending on the seat design. As a result, it is easy to secure a mounting space adapted to the seat design, thereby responding to an increase in size and capacity of the head chamber 12A.

The thickness-reduced portion 60 of the present embodiment is formed by heat-pressing the outer peripheral portion of the folded head chamber. The thickness-reduced portion formed in this way does not require an additional member other than the side airbag. Therefore, the manufacturing process is not complicated and the manufacturing can be facilitated.

In the present embodiment, the side airbag 12 is housed in the seat back 18 while being rolled from the front end in the seat fore-and-aft direction. Therefore, there is little variation in the base cloth at the outer peripheral portion, and the shape can be kept easily. Thus, the thickness reduction process can easily be performed after the head chamber 12A is folded.

Supplementary Description

While the vehicle seat 14 according to the embodiment of the present disclosure has been described above, the present disclosure may be implemented in various modes within the scope of the claims.

Modification 1 of Thickness Reduction Process

Figure 9:
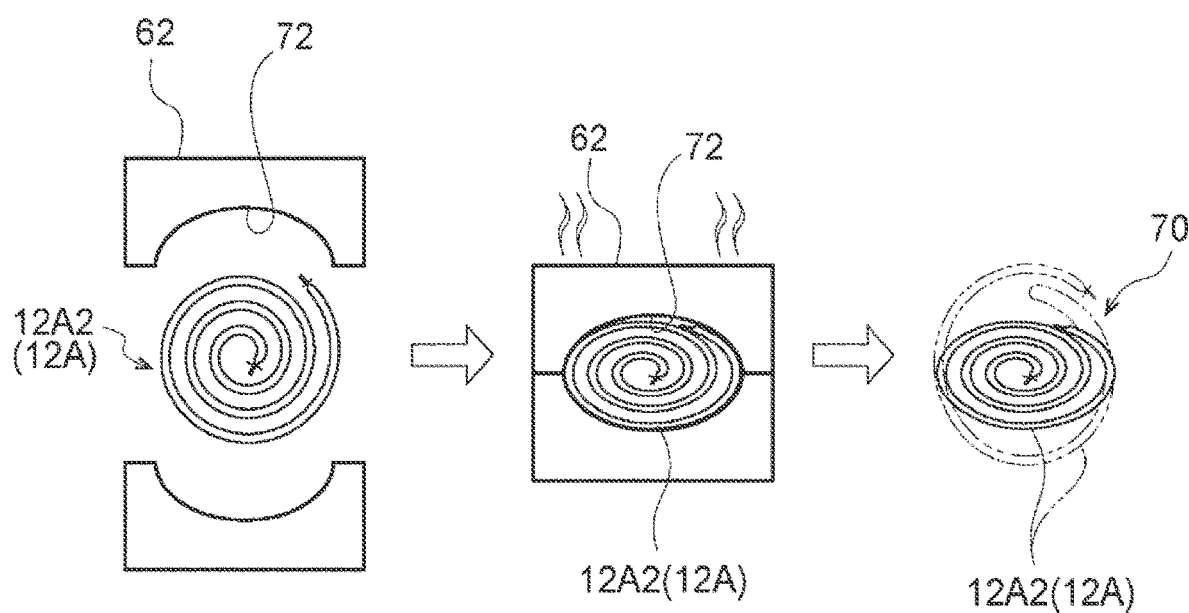
FIG. 9 is a schematic diagram corresponding to FIG. 6 for description of a thickness reduction process by heat press according to a modification of the embodiment.

For example, in the heat press used in the embodiment described above, the fold thickness is reduced by uniformly pressurizing and heating the entire outer peripheral portion of the head chamber 12A, but the heat press is not limited to this case. For example, as in Modification 1 shown in FIG. 9, the die 62 to be used for the heat press may have a recess 72 having a substantially elliptical outer peripheral shape to form a thickness-reduced portion 70 so that the shape of the head chamber 12A after the process is flat in the seat height direction. As a result, the fold thickness in the seat height direction can further be reduced by the thickness-reduced portion 70 when the head chamber 12A is housed along the upper frame 34.

As shown in FIGS. 10A to 10D, the thickness reduction process may be performed with a surface material arranged on the outer peripheral portion of the folded head chamber 12A.

Modification 2 of Thickness Reduction Process

Figure 10A:
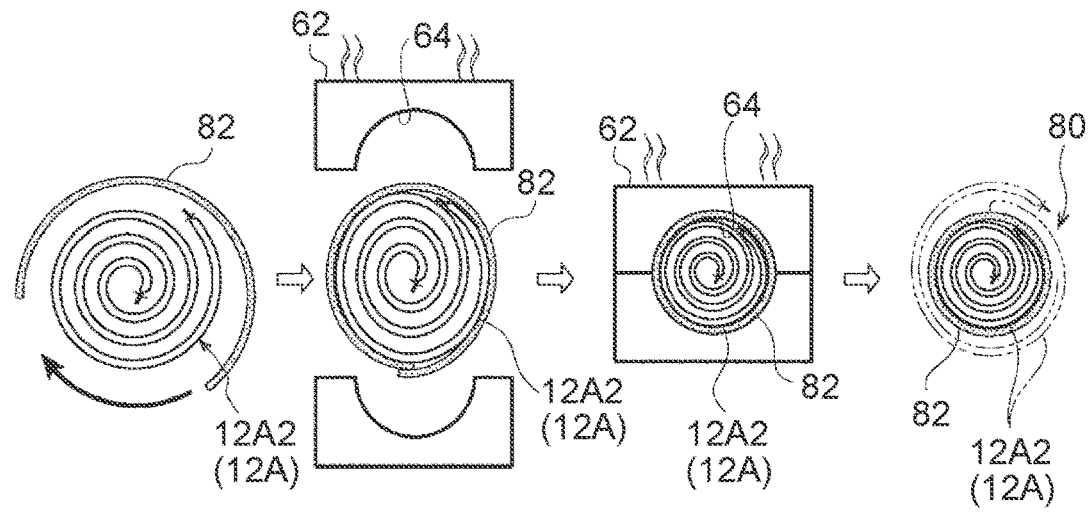
FIG. 10A is a schematic diagram for describing a thickness reduction process according to a modification of the embodiment, relating to a modification in which a part of an outer peripheral portion of the head chamber is covered with a surface material.

For example, as in Modification 2 shown in FIG. 10A, the outer peripheral portion of the head chamber 12A may be heat-pressed in the die 62 while being covered with a hot-melt surface material 82. Examples of the surface material 82 include a hot-melt felt (nonwoven fabric) made of a resin material having heat meltability. In a thickness-reduced portion 80 formed in this way, the reduced shape of the head chamber 12A is kept by the surface material 82 melted on the surface of the outer peripheral portion. Therefore, the side airbag 12 is manageable, and the attachment to the seat back 18 can be facilitated.

Modification 3 of Thickness Reduction Process

Figure 10B:
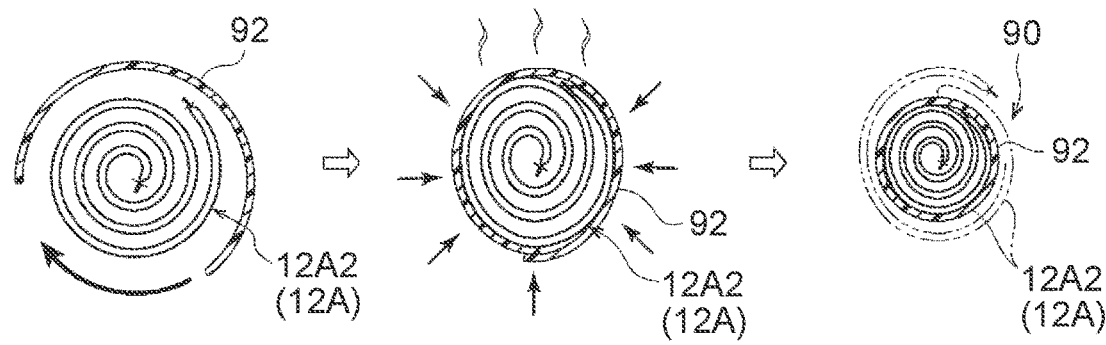
FIG. 10B is a schematic diagram for describing a thickness reduction process according to a modification of the embodiment, relating to a modification in which a part of the outer peripheral portion of the head chamber is covered with a surface material.

For example, as in Modification 3 shown in FIG. 10B, the thickness reduction process may be a method using pressurization based on a shrinkage force of a surface material 92. The thickness reduction process of Modification 3 is performed by covering the outer peripheral portion of the folded head chamber 12A with a heat-shrinkable film having a heat-shrinking property and then heating the surface material 92 from the outside. The surface material 92 pressurizes the outer peripheral portion of the head chamber 12A with a shrinkage force generated by the heating, thereby forming a thickness-reduced portion 90 in which the fold thickness of the head chamber 12A is reduced. In Modification 3, the surface material 92 is the film, but is not limited to the film, and may be a heat-shrinkable tube.

Modification 4 of Thickness Reduction Process

Figure 10C:
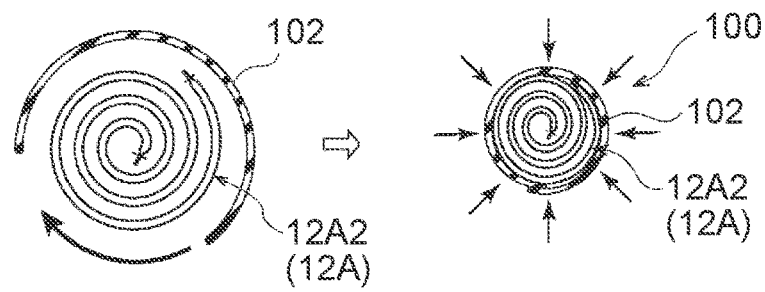
FIG. 10C is a schematic diagram for describing a thickness reduction process according to a modification of the embodiment, relating to a modification in which a part of the outer peripheral portion of the head chamber is covered with a surface material.

As in Modification 4 shown in FIG. 10C, a surface material 102 to be used for the thickness reduction process may be a sheet-shaped member having a shrinking property with an elastic force. For example, the surface material 102 is a sheet-shaped member made of an elastic rubber material, and is wound around the outer peripheral portion of the head chamber 12A while being stretched by elastic deformation. The head chamber 12A is pressurized by an elastic restoration force of the surface material 102, thereby forming a thickness-reduced portion 100 in which the fold thickness is reduced. The surface material 102 according to Modification 4 is not limited to the sheet-shaped member, but may be a tubular member.

In the thickness-reduced portions 90 and 100 formed by the thickness reduction processes of Modifications 3 and 4, the outer peripheral portions are covered with the surface materials 92 and 102 to keep the shapes after the shrinkage. Therefore, the side airbag is manageable, and the attachment to the seat back can be facilitated.

Since the surface materials 92 and 102 have the heat-shrinking property or the shrinking property based on the elastic force, a dedicated die or press machine, which is used in the case of performing the thickness reduction process by the heat press, is not required. As a result, the scale of manufacturing equipment can be reduced.

Modification 5 of Thickness Reduction Process

Figure 10D:
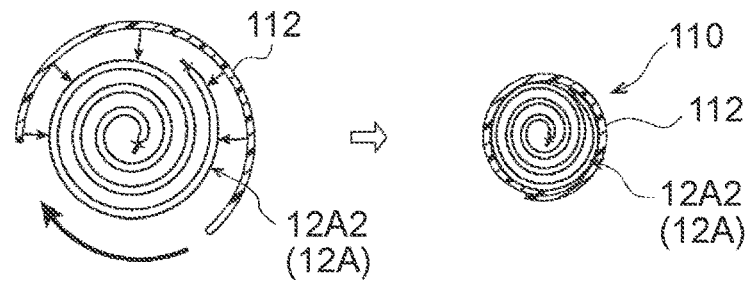
FIG. 10D is a schematic diagram for describing a thickness reduction process according to a modification of the embodiment, relating to a modification in which a part of the outer peripheral portion of the head chamber is covered with a surface material.

As in a thickness reduction process of Modification 5 shown in FIG. 10D, a surface material 112 need not have a shrinkage force. In this case, it is possible to perform a thickness reduction process for reducing the fold thickness by, for example, pressurizing the outer peripheral portion of the head chamber 12A in such a manner that the surface material 112 is wound around the outer peripheral portion under tension. A thickness-reduced portion 110 can be formed in this way by using a wrapping material to be used as a packaging material for an airbag. Thus, the material cost can be reduced.

Figure 11:
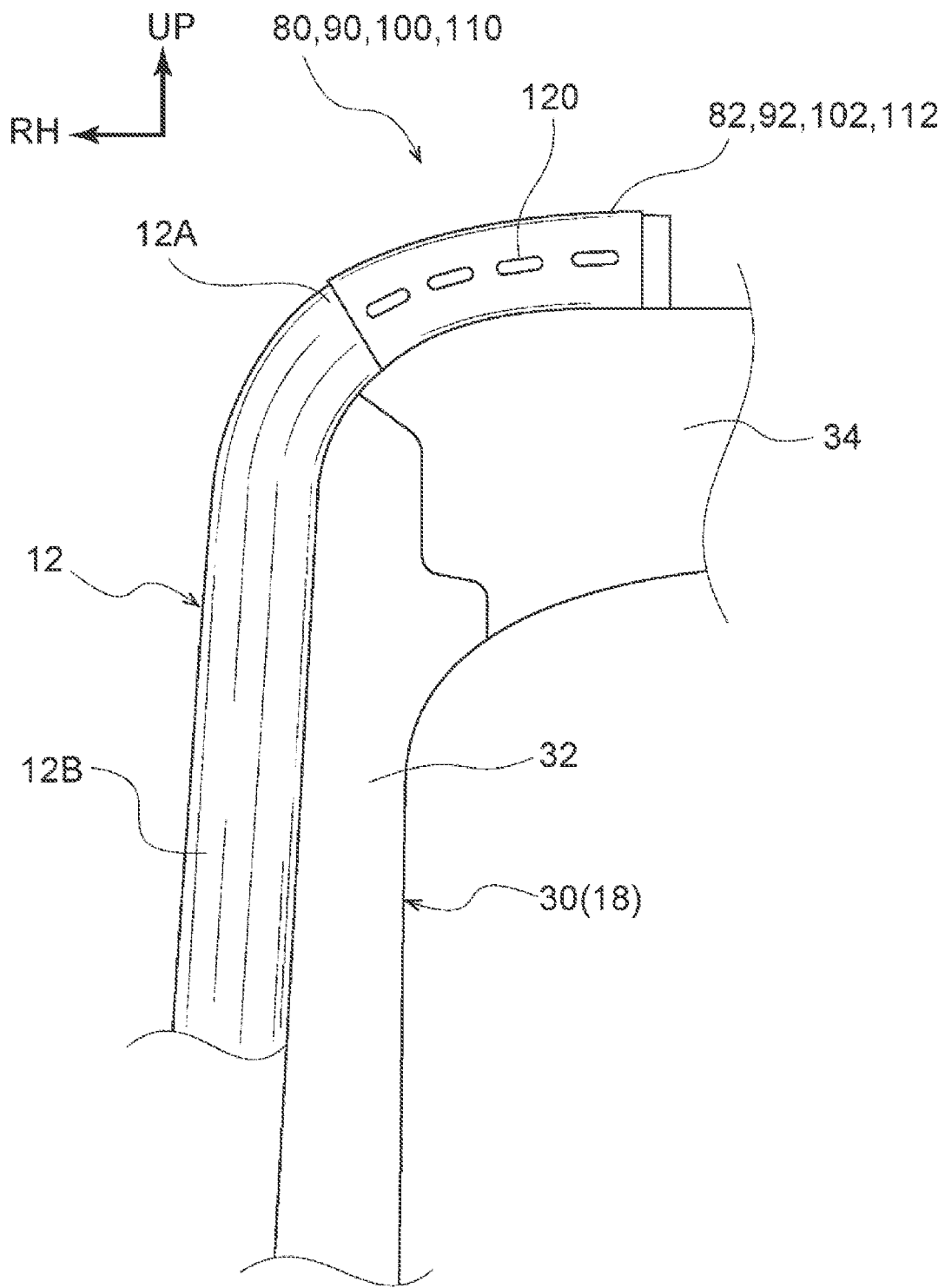
FIG. 11 is a partially enlarged front view showing a state in which the head chamber subjected to any one of the thickness reduction processes shown in FIGS. 10A to 10D is housed.

As shown in FIG. 11, each of the surface materials 82, 92, 102, and 112 of the thickness-reduced portions 80, 90, 100, and 110 according to Modifications 2 to 5 has a rupturable portion 120 facing the front side of the seat in a state in which the head chamber 12A is housed. Examples of the rupturable portion 120 include an array of a plurality of thin grooves formed on the surface of each of the surface materials 82, 92, 102, and 112 or a plurality of through holes formed through each of the surface materials. During the inflation and deployment of the side airbag 12, each of the surface materials 82, 92, 102, and 112 is quickly ruptured along the rupturable portion 120 by a gas pressure applied from the head chamber 12A. As a result, the inflation and deployment of the head chamber 12A toward the front side of the seat are not impaired by each of the surface materials 82, 92, 102, and 112, and the deployment performance can be improved.

In the embodiment described above, the side airbag 12 inflates and deploys from the outer lateral side in the vehicle width direction with respect to the body of the occupant P, but the side airbag 12 is not limited to this case. The side airbag 12 may inflate and deploy from an inner lateral side in the vehicle width direction (center side of the vehicle) with respect to the body of the occupant P.

In the embodiment described above, the side airbag device 10 is mounted on the front seat of the vehicle, but the present disclosure is not limited to this case. The side airbag device 10 may be mounted on a rear seat of the vehicle.

What is claimed is:

1. A vehicle seat comprising:
a seat back including an upper frame;
an inflator configured to supply gas; and
a side airbag including a head chamber housed along the upper frame of the seat back and configured to inflate and deploy between a shoulder belt and a head in response to supply of gas from the inflator in an event of side collision,
wherein the head chamber is housed while being folded in a seat up-and-down direction multiple times into a bellows form to reduce a vertical width and then rolled from a front end in a seat fore-and-aft direction, the bellows form defines a plurality of head chamber folded portions overlapping in a vehicle width direction.

2. The vehicle seat according to claim 1, wherein the head chamber is housed while being rolled from the front end in the seat fore-and-aft direction after an upper end in the seat up-and-down direction is folded downwardly toward an occupant and a lower end obtained by folding the upper end is folded upwardly toward the occupant.

3. The vehicle seat according to claim 1, wherein the head chamber is housed while being folded in the seat up-and-down direction to reduce the vertical width, rolled from the front end in the seat fore-and-aft direction, and inwardly rolled into a roll form at least at a rear end that is an end of winding with a distal end of rolling located on an inner side of the seat.

4. The vehicle seat according to claim 1, wherein
the seat back further includes a side frame,
the side airbag further includes a torso chamber housed along a region from a side portion to a shoulder of the side frame of the seat back and configured to inflate and deploy on a side of a torso in the event of side collision, and
the head chamber and the torso chamber are provided in a single bag, and are housed while being inwardly rolled from the front end in the seat fore-and-aft direction.

5. The vehicle seat according to claim 1, wherein a region of the head chamber folded in the seat up-and-down direction to have a large roll diameter is subjected to a thickness reduction process for reducing a thickness of the head chamber.

6. The vehicle seat according to claim 5, wherein the thickness reduction process includes a heat press process using a die.

7. The vehicle seat according to claim 6, wherein a base cloth of the side air bag includes a coat base cloth covered with a resin that melts and cures through heating.

8. The vehicle seat according to claim 6, wherein a shape of the region subjected to the thickness reduction process is flat in a seat height direction.

9. The vehicle seat according to claim 6, wherein the thickness reduction process includes heat-pressing an outer peripheral portion of the head chamber in the die while covering the outer peripheral portion with a hot-melt surface material.

10. The vehicle seat according to claim 9, wherein the surface material has a rupturable portion facing a front side of the seat in a state in which the head chamber is housed.

11. The vehicle seat according to claim 5, wherein the thickness reduction process includes covering an outer peripheral portion of the head chamber with a surface material and then heating the surface material from the outside, the surface material being a heat-shrinkable film having a heat-shrinking property.

12. The vehicle seat according to claim 11, wherein the surface material has a rupturable portion facing a front side of the seat in a state in which the head chamber is housed.

13. The vehicle seat according to claim 5, wherein the thickness reduction process includes winding a surface material around an outer peripheral portion of the head chamber while stretching the surface material, the surface material being a sheet-shaped member having a shrinking property with an elastic force.

14. The vehicle seat according to claim 13, wherein the surface material has a rupturable portion facing a front side of the seat in a state in which the head chamber is housed.

15. A method for folding a side airbag including a head chamber to be housed along an upper frame of a seat back, the method comprising:
folding the head chamber in a seat up-and-down direction multiple times into a bellows form to reduce a vertical width, the bellows form defines a plurality of head chamber folded portions overlapping in a vehicle width direction; and
rolling the head chamber from a front end in a seat fore-and-aft direction.

* * * * *